(12) United States Patent
Lizak (10) Patent No.: US 7,404,576 B2
(45) Date of Patent: Jul. 29, 2008

(54) PILLAR TRIM COMPONENT

(75) Inventor: Daniel G. Lizak, Howell, MI (US)

(73) Assignee: Nissan Technical Center North America, Inc., Farmington Hills, MT (US)

( * ) Notice: Subject to any disclaimer, the term of this patent is extended or adjusted under 35 U.S.C. 154(b) by 300 days.

(21) Appl. No.: 11/096,802

(22) Filed: Apr. 1, 2005

(65) Prior Publication Data

US 2006/0220357 A1 Oct. 5, 2006

(51) Int. Cl.
*B60R 21/16* (2006.01)
(52) U.S. Cl. .................................... 280/743.2
(58) Field of Classification Search ............. 280/730.2, 280/728.2, 743.2
See application file for complete search history.

(56) References Cited

U.S. PATENT DOCUMENTS

| | | | | |
|---|---|---|---|---|
| 6,145,870 | A * | 11/2000 | Devane et al. | 280/728.2 |
| 6,565,117 | B2 * | 5/2003 | Kubota et al. | 280/730.2 |
| 6,848,711 | B2 * | 2/2005 | Yamamura et al. | 280/730.2 |
| 6,851,710 | B2 * | 2/2005 | Wong et al. | 280/743.2 |
| 2001/0022441 | A1 | 9/2001 | Nakajima et al. | |
| 2001/0040360 | A1 | 11/2001 | Ishiyama et al. | |
| 2003/0132620 | A1 | 7/2003 | Kawasaki et al. | |
| 2003/0178822 | A1 | 9/2003 | Yamamura et al. | |
| 2004/0188985 | A1 * | 9/2004 | Nagata | 280/728.2 |
| 2007/0108742 | A1 * | 5/2007 | Itakura | 280/728.3 |

FOREIGN PATENT DOCUMENTS

JP 2001106014 A * 4/2001

* cited by examiner

*Primary Examiner*—Paul N. Dickson
*Assistant Examiner*—Drew J. Brown
(74) *Attorney, Agent, or Firm*—Young Basile Hanlon Macfarlane & Helmholdt P.C.

(57) ABSTRACT

A pillar trim component is provided that has a pillar trim member with at least one surface and an attachment member projecting from the surface of the pillar trim member. The pillar trim component includes an attachment member adapted to connect to a portion of the vehicle. The pillar trim component further has a region defined by at least a portion of the surface of the pillar trim member and at least a portion of a surface of the attachment member. A raised portion is positioned in the region that extends between the portion of the surface of the pillar trim member and the portion of the surface of the attachment member. The raised portion is adapted to facilitate a deployment of a tether of an airbag.

21 Claims, 7 Drawing Sheets

FIG. 7

PILLAR TRIM COMPONENT

BACKGROUND

Conventional vehicles are equipped with airbags that deploy in the event of a collision with another vehicle or object. When deployed, the airbags act as an inflated cushion that absorbs the impact of a passenger in the vehicle. One type of airbag, known as a side airbag, deploys on a side of the vehicle to absorb impact by the vehicle passenger against that side of the vehicle. In one aspect, a tether connects the side airbag to a pillar of the vehicle to add support for the airbag when in its deployed state. When in an undeployed state, the tether is commonly located between the pillar and a pillar trim member.

BRIEF DESCRIPTION OF THE DRAWINGS

The present invention will now be described, by way of example, with reference to the accompanying drawings, in which.

DETAILED DESCRIPTION

Figure 1:
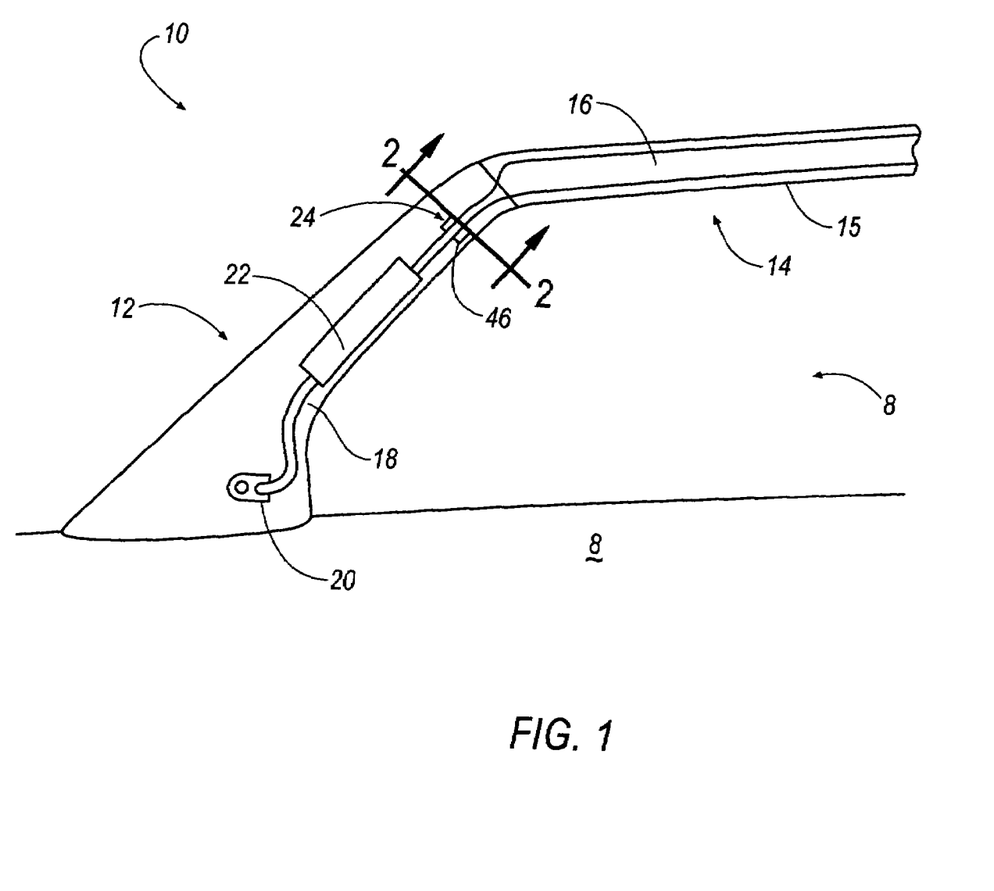
FIG. 1 is a schematic view of a vehicle pillar and roof assembly according to an embodiment of the present invention.

Referring now to FIG. 1, an embodiment of a vehicle pillar and roof assembly is shown and described. In FIG. 1, a vehicle pillar and roof assembly 10 is shown having a pillar assembly 12 and a roof assembly 14.

In an embodiment, the roof assembly 14 generally includes an airbag 16 positioned within an enclosure 15. The enclosure 15 allows the airbag 16 to expand and deploy as will be understood by one skilled in the art.

Figure 2:
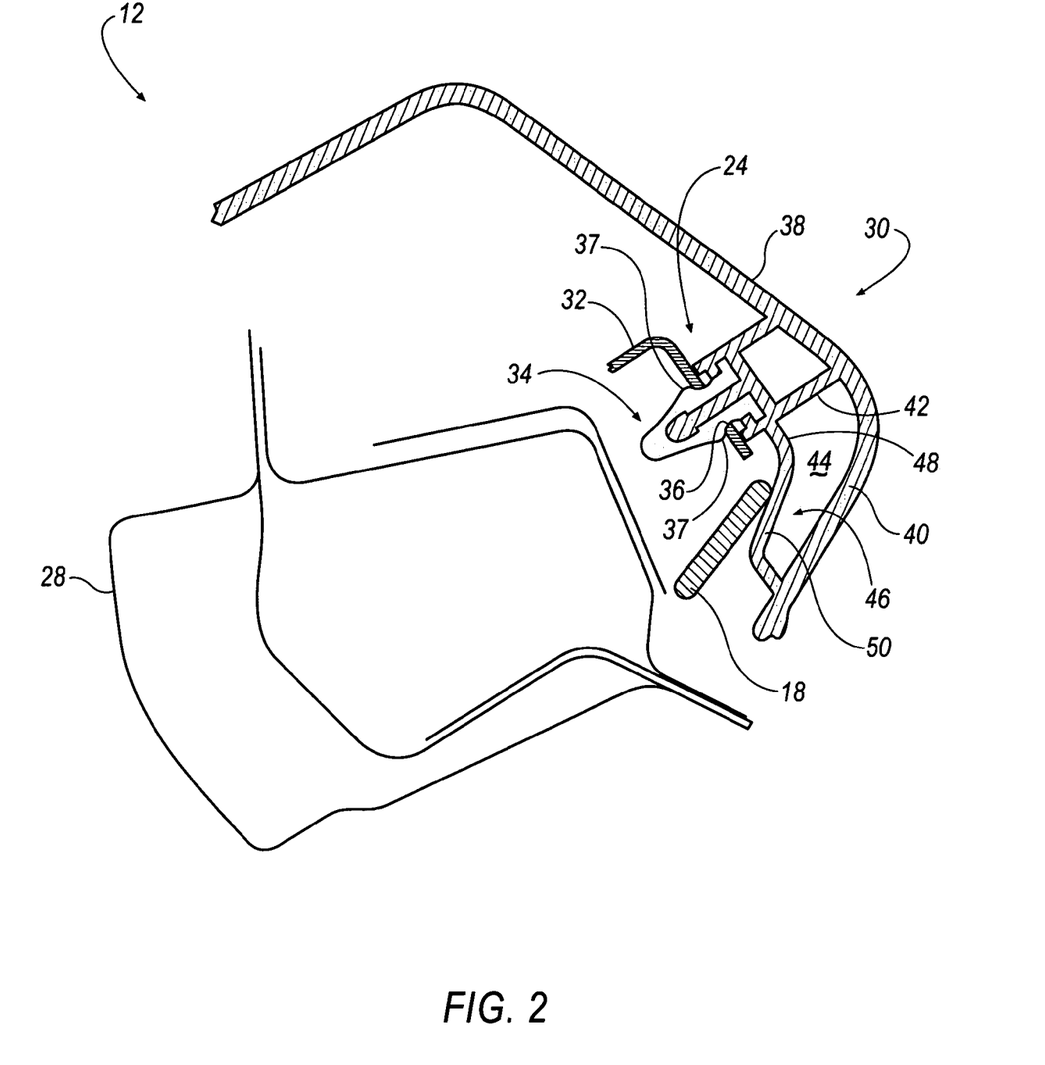
FIG. 2 is a cross-sectional view along II-II in FIG. 1 according to an embodiment of the present invention.

Referring to FIG. 2 and with continued reference to FIG. 1, the pillar assembly 12 is described in greater detail. The pillar assembly 12 generally includes a tether 18 positioned between a pillar trim member 30 and a pillar 28. The tether 18 connects to a portion of the airbag 16 at one end and connects to a connector 20 at the other end (see FIG. 1). The connector 20 is, in turn, connected to the pillar 28 (see FIG. 2 for an illustration of the pillar). The tether 18 supports the airbag 16 when the airbag 16 is in a deployed state, as will be discussed in greater detail hereinafter (see the example in FIG. 7).

In one embodiment, the pillar 28 is a structural member disposed in a vehicle 8 that connects between a roof portion and a body portion of the vehicle 8. In the embodiment depicted in FIG. 1, pillar 28 is an A-pillar that connects the dashboard and roof portion of vehicle 8. In an embodiment, the pillar trim member 30 is an interior covering for the pillar 28. The pillar trim member 30 may be connected to the pillar 28, for example, through an interlocking arrangement between pillar bracket 32 of the pillar 28 and clip 34 of the pillar trim member 30. In an embodiment, the pillar trim member 30 includes a base surface 38 that angles into a wall surface 40. Of course, one skilled in the art will readily recognize that the pillar trim member 30 may have other geometric configurations than that depicted and/or described herein. Bracket 32 may be connected to a portion of the pillar 28. In the illustrated example, clip 34 is a spring element that compresses to allow outer portion 37 to pass through an aperture 36 of the pillar bracket 32.

In an embodiment of the invention, clip 34 is supported by an attachment member 24. The attachment member 24 may be a separate component attached to the pillar trim member 30 or may be integrally formed with the pillar trim member 30 through an injection or other molding process or by other means known to one skilled in the art. The attachment member 24 may extend substantially outwardly with respect to the base surface 38 of the pillar trim member 30. More specifically, although the attachment member 24 may be angled with respect to a normal direction from the base surface 38, it may extend sufficiently outward to position the clip 34 at a location sufficient for interlocking with pillar bracket 32.

Figure 3:
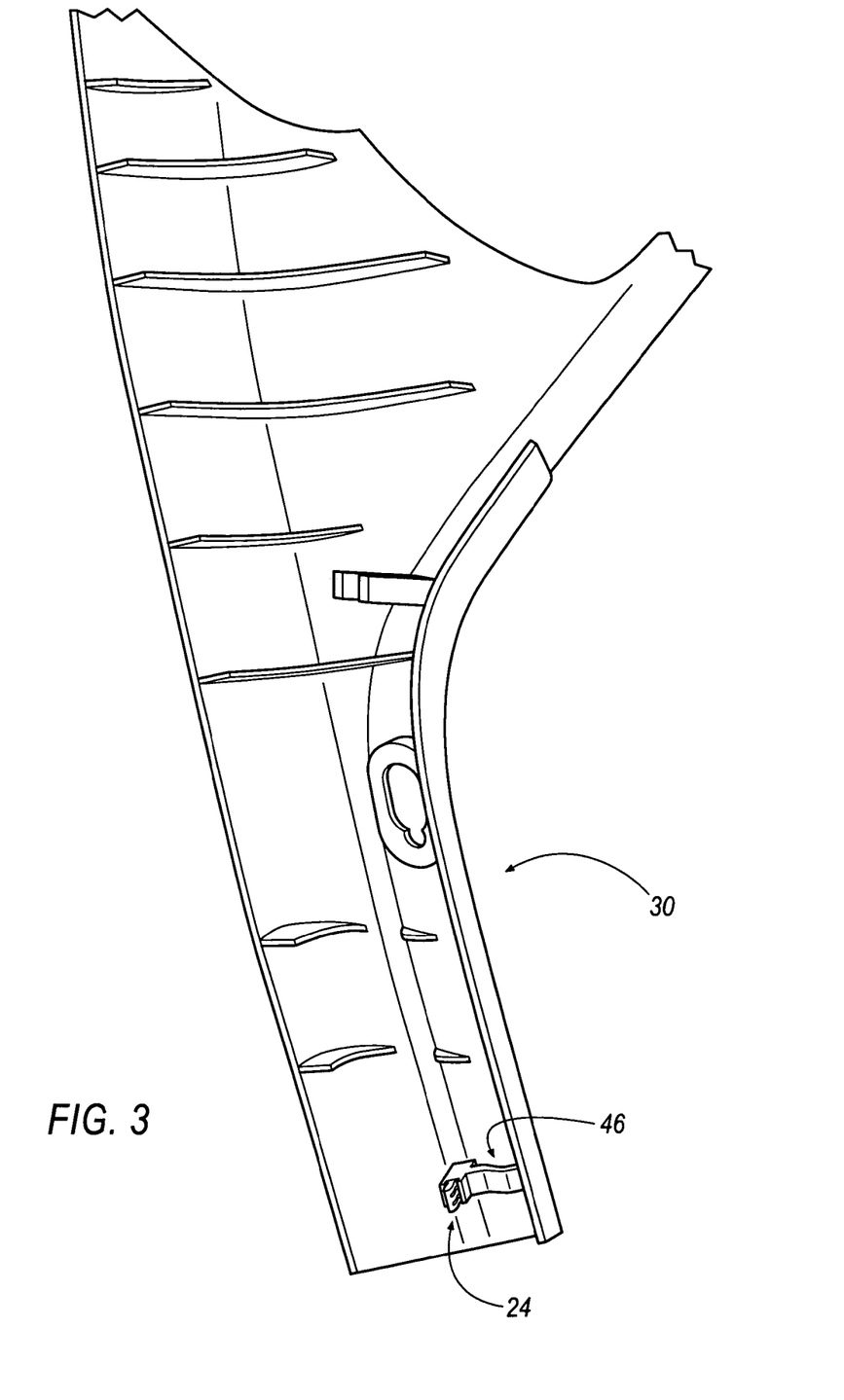
FIG. 3 is a perspective view of a pillar trim component according to an embodiment of the present invention.

Referring now to FIG. 3, a perspective view of an embodiment of the pillar trim member 30 is shown. In the example illustrated in FIG. 3, the attachment member 24 is shown with a raised portion 46 (that will be discussed in greater detail) that is positioned proximate the roof assembly 14 (see also FIG. 1). Other attachment members 24 may be also located at other locations along the pillar trim member 30. Other attachment members 24 may or may not be used in connection with raised portions 46. Thus, it will be understood that the attachment member 24 and other described components may be located at a position more distal from the roof assembly 14 than the illustrated attachment member 24. Likewise, it will be understood that, although only one attachment member 24 is shown, multiple attachment members may be provided along the length of the pillar assembly 12.

Figure 4:
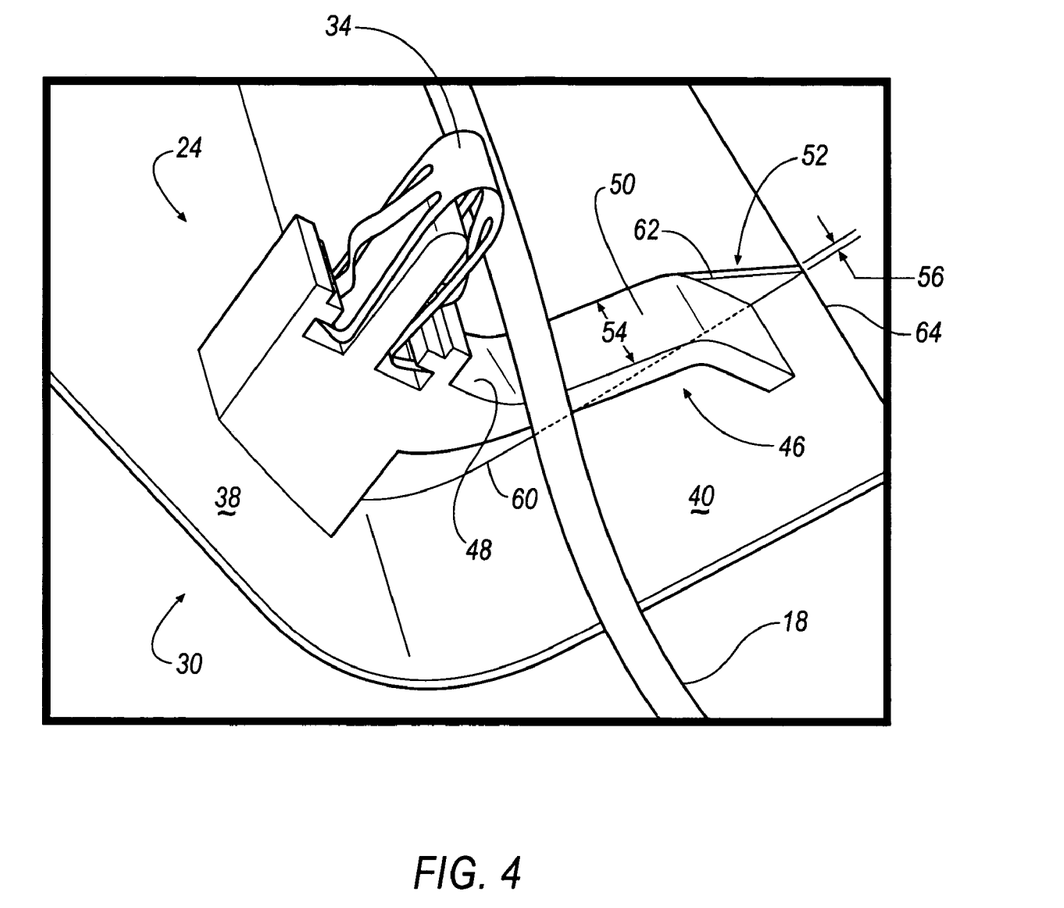
FIG. 4 is a perspective view of a pillar trim component according to an embodiment of the present invention.

Referring now to FIGS. 2 and 4, the raised portion 46 is described in greater detail. In FIGS. 2 and 4, the raised portion 46 is shown positioned in or about a region 44 of the pillar trim member 30. The region 44 is a location between a surface 42 of the attachment member 24 and the wall surface 40 of the pillar trim member 30. This region is a region of the pillar trim member 30 that may snag or catch the tether during airbag deployment. Of course, one skilled in the art will readily recognize that the region 44 may be another suitable location besides the one described herein.

The raised portion 46 connects and bridges between the surface 42 and the wall surface 40 to position the tether away from the region 44 and/or provide a sloped region to facilitate deployment of the tether and avoid any snagging of the tether 18 during airbag deployment. The raised portion 46 generally includes a first portion 48 that extends substantially parallel to the base surface 38 and a second portion 50 that may extend substantially parallel to the wall surface 40. As shown, the tether 18 is positioned adjacent to the first surface 48 and/or the second portion 50.

As shown in FIG. 4, in an embodiment, the raised portion 46 is connected to and supported by a supporting member such as a rib 52. The rib 52 is a support member for the pillar trim member 30 that is connected to the pillar trim member 30 at an inner edge 60. An area proximate and outer edge 62 of the rib 52 connects to the raised portion 46. As such, a space is provided between the raised portion 46 and the pillar trim member 30. Of course, one skilled in the art will readily recognize that the raised portion 46 may extend down to the pillar trim member and, therefore, little or no space may exist. In an embodiment, as shown in FIG. 4, rib 52 has a thickness 56 and raised portion 46 has a thickness 54. In an embodiment, the thickness 54 of the raised portion 46 is greater than the thickness 56 of the rib 52. In an embodiment, the thickness 54 is sufficient to assist deployment of the tether 18 without snagging.

Figure 5:
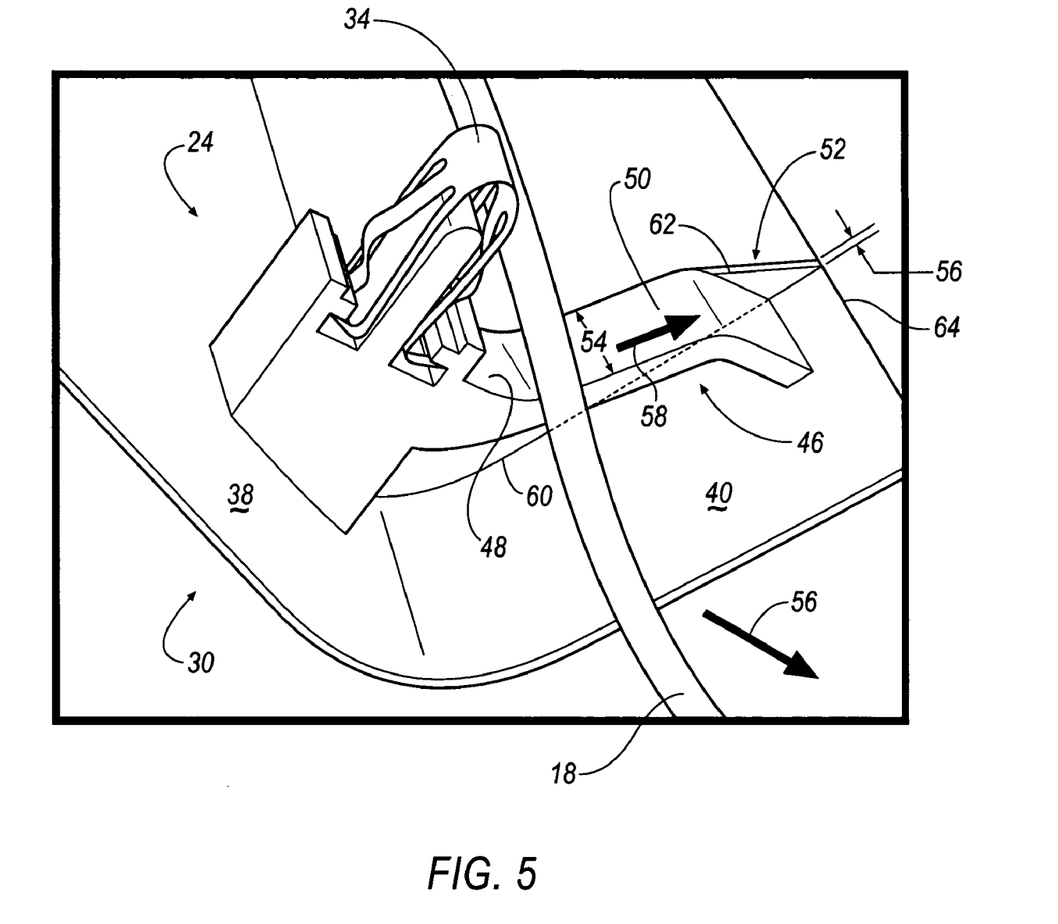
FIG. 5 is a perspective view of a pillar trim component according to an embodiment of the present invention.
Figure 6:
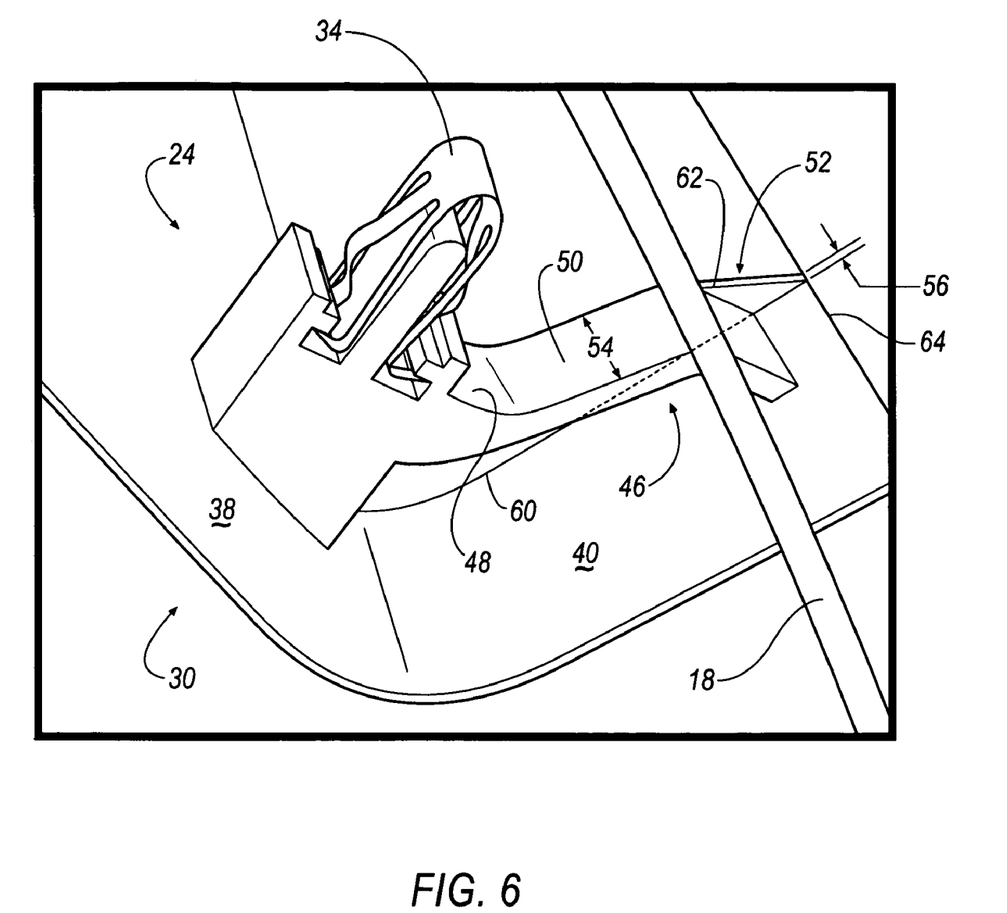
FIG. 6 is a perspective view of a pillar trim component according to an embodiment of the present invention.
Figure 7:
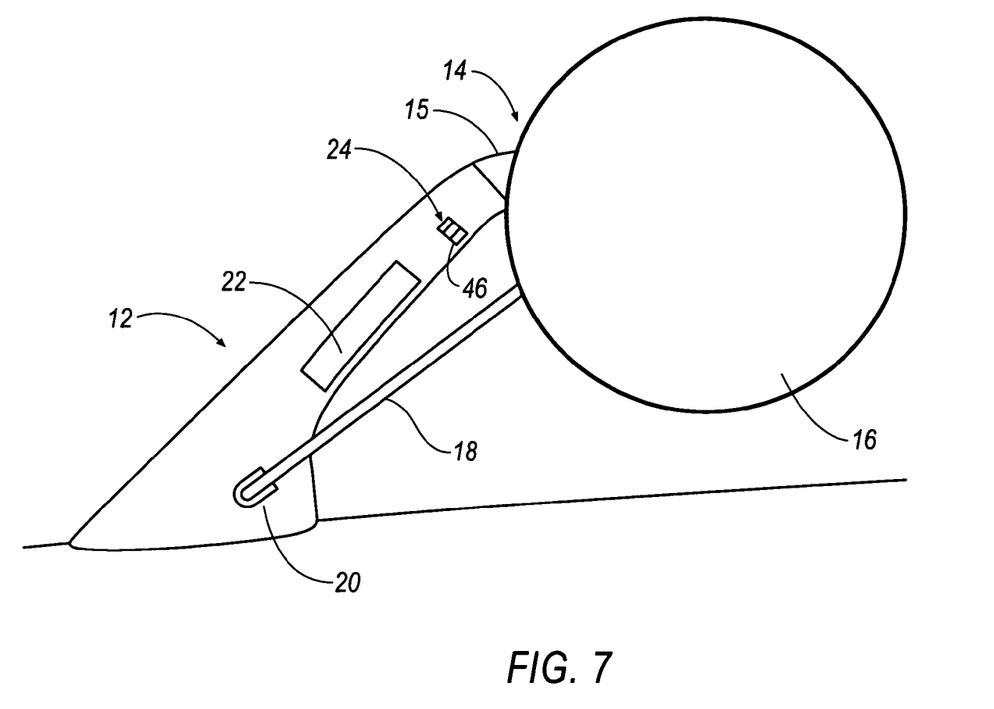
FIG. 7 is a schematic view of a vehicle pillar and roof assembly according to an embodiment of the present invention.

Referring now to FIGS. 1, 4, 5, 6, and 7, an operation of an embodiment of the present invention is shown and described. In FIG. 1, the tether 18 and airbag 16 are shown in an undeployed state. Here, the airbag 16 is encapsulated within enclosure 15 and the tether 18 is positioned between the pillar 28 and the pillar trim member 30. FIG. 7 illustrates the airbag 16 in a deployed state. Here, the airbag 16 has escaped from the enclosure 15 and a tether 18 is positioned mostly outside the pillar trim member 30 and the pillar 28. Connector 20 connects the tether 18 to the pillar 28 to support the airbag 16.

FIG. 4 illustrates the tether 18 in its undeployed state with respect to the raised portion 46. Here, the tether is positioned proximate the first portion 48 and the second portion 50. As shown in FIG. 5, when the airbag 16 is initially deployed, a force 56 acts upon the tether 18 and pulls the tether 18 against the second portion 50. The surface of the raised portion 46 then redirects this force along the second portion 50 in a direction 58. As shown in FIG. 6, this redirected force (see FIG. 5) moves the tether 18 toward outer region 64 to facilitate movement of the tether 18 out and around outer region 64 such that it may be positioned as shown in FIG. 7.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A pillar trim component comprising:
   a pillar trim member having a wall portion defining a central surface and at least one side wall surface;
   an attachment member projecting from the central surface of the pillar trim member, wherein the attachment member is adapted to connect to a portion of a vehicle;
   a region including at least a portion of the central surface of the pillar trim member and at least a portion of a surface of the attachment member; and
   a raised portion positioned in the region that extends between the side wall surface of the pillar trim member and the attachment member; wherein the raised portion is adapted to facilitate a deployment of a tether of an airbag
   wherein the raised portion further comprises:
   a first portion extending substantially perpendicular to a direction of protrusion of the attachment member, wherein the first portion is positioned on a side of the attachment member proximate the side wall surface; and
   a second portion substantially following a shape of the side wall surface; wherein the first portion is adjacent to the attachment member and is adapted to support the tether of an airbag when the airbag is in an non-deployed state; wherein the second portion is adjacent to the side wall surface and has a shape adapted to facilitate a deployment of the tether of the airbag when the airbag is deployed.

2. The pillar trim component according to claim 1, further comprising:
   a support rib connecting the portion of the surface of the attachment member to the wall surface; wherein the raised portion is connected to and supported by the support rib.

3. The pillar trim component according to claim 2, wherein the raised portion substantially conforms to a contour of an outer edge of the support rib.

4. The pillar trim component according to claim 2, wherein:
   the support rib has a support rib thickness; and the raised portion has a raised portion thickness; wherein the raised portion thickness is greater than the support rib thickness.

5. The pillar trim component according to claim 1, wherein:
   the pillar trim member is an A-pillar for a vehicle; and
   the A-pillar has a roof end adapted to be positioned proximate a roof portion of the vehicle and a dash end adapted to be positioned proximate a dashboard of the vehicle.

6. The pillar trim component according to claim 5, further comprising:
   a plurality of attachment members and a plurality of corresponding regions;
   wherein one of the plurality of attachment members and a respective one of the plurality of regions are positioned proximate the roof end with respect to a remainder of the plurality of attachment members and plurality of regions; and
   wherein the raised portion is positioned in only the one of the plurality of regions proximate the roof end.

7. The pillar trim component according to claim 1, wherein a surface of the second portion extends away from and at an angle to the first portion.

8. A pillar trim component for a vehicle, comprising:
   a pillar trim member having a central base portion with a first interior facing surface and a side wall portion with a second interior facing surface, the side wall portion extending from the central base portion and defining a distal edge of the pillar trim member, wherein the first and the second interior facing surfaces are arranged in a non-coplanar configuration;
   an attachment member extending from the first interior facing surface and adapted to selectively connect the pillar trim member to a portion of a vehicle; and
   a ramp portion having a first end connected to the attachment member, a second end connected to the second interior facing surface near the distal edge, and a central portion interconnecting the first and second ends and spaced apart from the first and second interior facing surfaces to define an aperture therebetween, at least a portion of the ramp portion configured and arranged to guide a tether operatively connected to an airbag past the distal edge of the pillar trim member during deployment of the airbag.

9. The central portion of claim 8, further comprising at least a first portion near the first end and a second portion near the second end.

10. The pillar trim component of claim 9, wherein the first portion extends substantially perpendicular to the attachment member.

11. The pillar trim component of claim 10, wherein the first portion is adapted to support the tether when the airbag is in a non-deployed state.

12. The pillar trim component of claim 9, wherein the second portion is adapted to facilitate deployment of the tether past the distal edge when the airbag deploys.

13. The pillar trim component of claim 12, wherein the second portion is substantially parallel to the side wall portion.

14. The pillar trim component of claim 12, wherein the second portion is shaped to correspond to the contour of the side wall portion.

15. The pillar trim component of claim 9, wherein a distal edge of the second portion defines a plane corresponding to the distal edge of the pillar trim member.

16. The pillar trim component of claim 9 further comprising:
a support rib connecting the attachment member to the side wall portion;
wherein the ramp is connected to and supported by the support rib.

17. The pillar trim component of claim 16, wherein:
the support rib has a support rib thickness; and
the ramp has a ramp thickness;
wherein the ramp thickness is greater than the support rib thickness.

18. The pillar trim component of claim 8, wherein the ramp is further configured and arranged to prevent the tether from entering the aperture defined by the first and second internal surfaces and the ramp.

19. The pillar trim component of claim 8, wherein:
the pillar trim member is an A-pillar for a vehicle; and
the A-pillar has a roof end adapted to be positioned proximate a roof portion of the vehicle and a dash end adapted to be positioned proximate a dashboard of the vehicle.

20. The pillar trim component of claim 19, further comprising a plurality of attachment members.

21. The pillar trim component of claim 20, wherein:
one of the plurality of attachment members and a respective one of the plurality of areas are positioned proximate the roof end with respect to a remainder of the plurality of attachment members and plurality of areas; and
wherein the ramp is positioned in only the one of the plurality of areas proximate the roof end.

* * * * *